Nov. 4, 1947.   L. F. BENDER ET AL   2,429,983
MILKING APPARATUS
Filed June 12, 1942
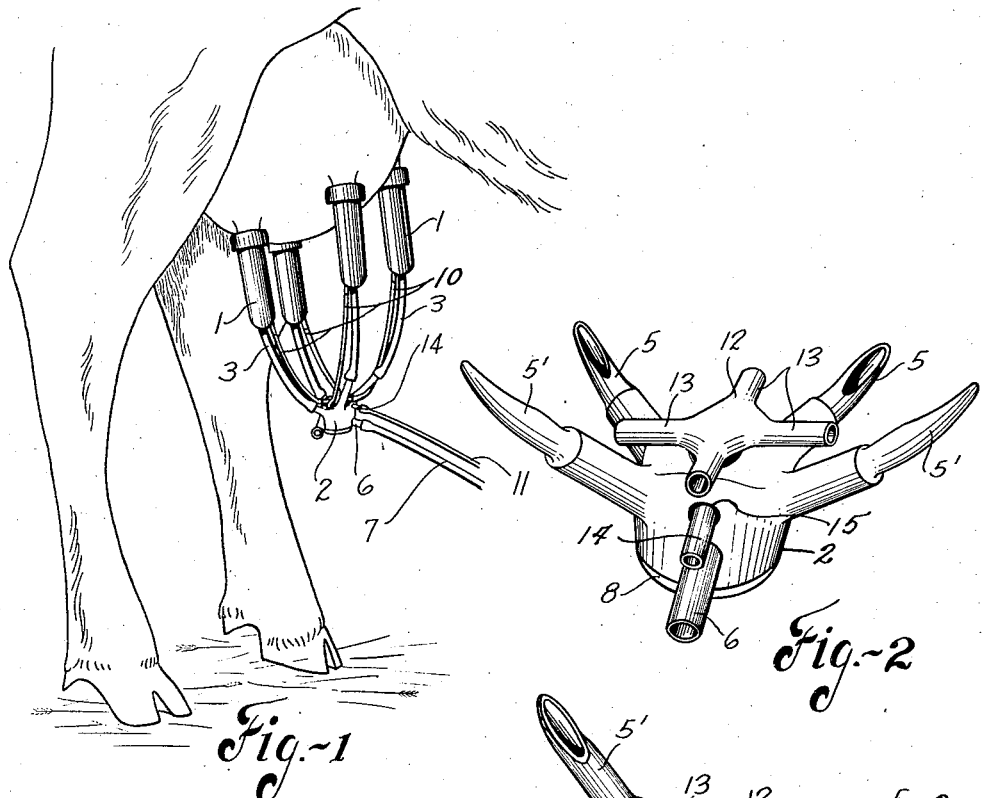
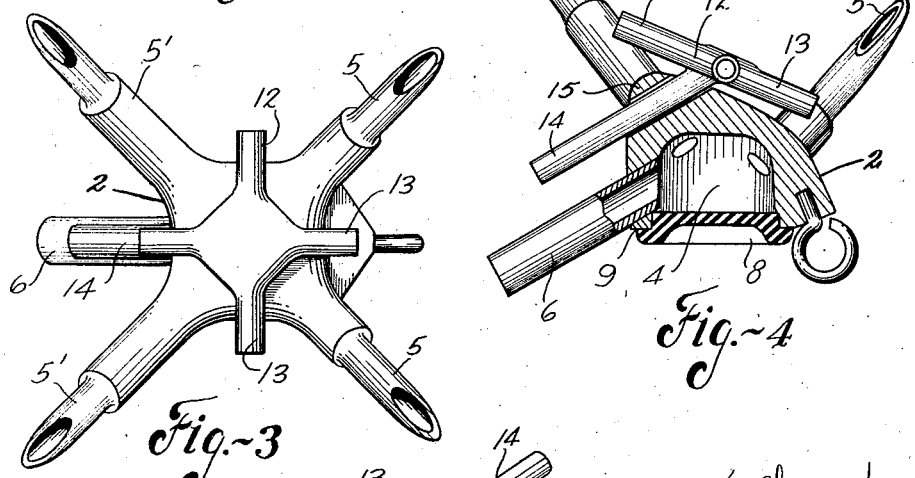
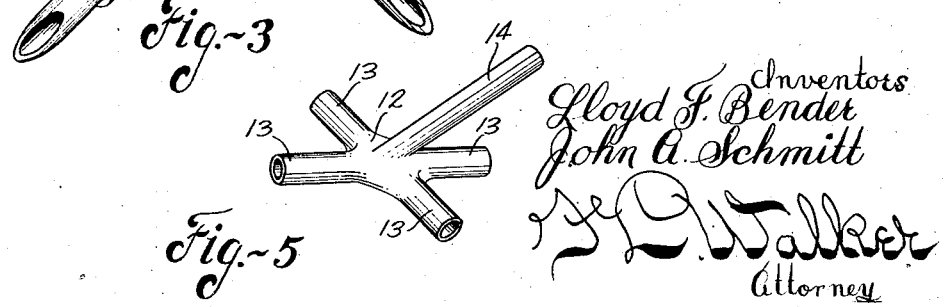
Inventors
Lloyd F. Bender
John A. Schmitt
F. D. Walker
Attorney Patented Nov. 4, 1947

2,429,983

UNITED STATES PATENT OFFICE 2,429,983

MILKING APPARATUS

Lloyd F. Bender, Waukesha, and John A. Schmitt, Milwaukee, Wis., assignors to The Universal Milking Machine Company, Waukesha, Wis., a corporation of Wisconsin Application June 12, 1942, Serial No. 446,742

14 Claims. (Cl. 31—83)

This invention pertains to milking apparatus, and more particularly to teat cup claws for interconnecting a cluster of teat cups with the milking apparatus. While teat cups of the pneumatic pulsating type are employed, the new and novel features of the teat cup claw are applicable to other types of apparatus.

The size and shape of different cows' udders and relative disposition of the teats thereon vary greatly. However, in almost every instance the forward teats are more widely spaced and at a higher level than the rearmost teats. The weight of the suspended portions of the milking apparatus has considerable influence upon the success of the milking operation. When teat cups having connecting tubes of equal length are employed, as has been usual, the weight of the attached claw causes it to swing forwardly so that it is supported to greater extent by the forward and higher teats than by the rearmost teats.

In the present disclosure such tendency is overcome by making the hose nipples of the teat cup claw of unequal length to compensate for the difference in elevation of the forward and rear teats. Incident to the increased length of the forward teat cup nipples, the attached teat cups are also more widely spaced. This enables the center of gravity of the claw to swing rearwardly so that the claw is uniformly suspended from all four of the teats.

The object of the invention is to improve the construction as well as the means and mode of operation of teat cup claws, whereby they may not only be economically constructed, but will be more efficient in use, uniform in action, and unlikely to get out of repair.

A further object of the invention is to so construct and arrange the teat cup connections to the claw unit as to compensate for different spacing and elevation of the forward and rearmost teats and enable the weight thereof to be substantially uniformly distributed upon the teats.

A further object of the invention is to provide a teat cup claw of compact shape and wherein the interior passages and recess are easily accessible for cleaning.

A further object of the invention is to provide an improved form of air tube coupling and for releasably engaging it with the claw unit.

A further object of the invention is to provide a closure member for the milk chamber of the claw unit.

A further object of the invention is to facilitate the milking operation and enable more rapid and more complete extraction of the milk supply.

A further object of the invention is to provide a milking machine claw unit having the advantageous structural features and inherent meritorious characteristics and mode of operation herein described.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a side elevation of a portion of a milking apparatus, including a teat cup claw embodying the present invention, applied to a cow.

Fig. 2 is a perspective view of a teat cup claw unit embodying the present invention.

Fig. 3 is a top plan view thereof.

Fig. 4 is a vertical sectional view thereof.

Fig. 5 is a perspective view of the air tube coupling detached from the main body of the claw unit.

Like parts are indicated by similar characters of reference throughout the several views.

In the use of modern milking apparatus employing pneumatic teat cups, it is customary to interconnect the interiors of the teat cup inflations with a coupling or claw unit common thereto by flexible tubes of uniform length. The claw in turn is connected to a milk receiver by a hose conduit through which the teats within the teat cups are subjected to intermittent suction influence. The pneumatic chambers of the teat cups are connected with a common coupling by short air hose, and the coupling is connected by a common air hose with a distant pulsator mechanism for alternate exhaustion and admission of air to afford intermittent compression or squeezing effect. The weight of the claw unit and air tube coupling and various milk and air tubes is suspended from the cow's teats. The forward teats being at a higher level and more widely spaced, there is a strong tendency for the claw unit to swing forwardly, as shown by dotted lines in Fig. 1, and thereby transfer the preponderance of its weight to those teats.

Referring to Fig. 1, 1—1 are the teat cups, which are connected to the claw unit 2 by short milk tubes 3. In order that the teat cups may be interchangeable and the inflations replaceable, the milk tubes are ordinarily of uniform length.

When attached to an ordinary claw unit, which is not especially designed as herein described, the claw unit tends to swing forwardly by gravity to the position shown by dotted lines, and the weight is supported principally by the two forward and higher teats. Quite to the contrary, as a result of the present improved construction the center of gravity of the claw unit is shifted rearwardly, as indicated by solid lines, until its weight and that of the milk and air tubes are substantially evenly distributed upon all the teats.

Referring to the drawings, the main body of the claw unit 2 has therein a milk receiving chamber 4. Projecting from the body of the unit 2 in uniformly spaced radial positions and inclined to the axis thereof, which passes vertically through the unit, are four inclined hose nipples 5 and 5' having a common point of intersection on the axis of the unit. The hose nipples 5', which pertain to the forward teats, are somewhat longer than the rearmost nipples 5. Incident to the increased length of the forward nipples 5', the ends thereof are more widely spaced than the remaining nipples 5 pertaining to the rear teats. The milk hose nipples 5 and 5' conduct the milk to the common chamber 4, from which it is withdrawn through the downwardly inclined exhaust nipple 6, to which is connected the milk conveyor tube 7. The bottom of the milk chamber 4 of the unit is closed by a removable flexible disc 8 of a resilient material, such as rubber or any one of the rubber-like commercial compositions, provided with a peripheral rabbet 9. The resiliency of the closure disc 8 is sufficient to maintain its engagement within the orifice of the chamber 4.

The air tubes 10, which communicate with the pulsating chambers of the teat cups 1, are interconnected with each other and with a common air conduit 11 to a pulsator by a cross coupling 12, comprising radially arranged nipples 13 disposed in a common plane, and an integral tubular stem 14 inclined to the plane of the nipples 13 connected at the center of radiation thereof.

The body 2 of the claw unit has therein a diagonal hole 15 through which the stem 14 of the air tube coupling loosely extends in substantially parallel spaced relation with the milk conduit nipple 6. When engaged therewith, the air tube coupling 12 rests upon the top of the claw body 2 with the nipples 13 interposed in alternating relation between the milk tube nipples 5 and 5'. Such air tube coupling by the disposition of its air tube nipples in alternating relation with the milk tube nipples of the claw, maintains proper distribution of the respective milk and air tubes. This arrangement also enables the air tube coupling to be easily and quickly connected and disconnected, and disposes the main milk and air conduits in a downward and forward direction, which avoids kinks and distortion which may interfere with free flow of milk and air. The unequal disposition of the forward teat cups in relation to the rear teat cups amply compensates for both the greater elevation and the wider spacing of the forward teats of the cow and equalizes the suspended weight of the assembly thereon, which has been found highly advantageous in effecting rapid and clean milking, leaving but little residue of milk for hand stripping.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, its is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A teat cup claw for a milking apparatus, including a recessed main body open at its bottom, a plurality of hose nipples inclined in radial planes communicating with the recessed body at equally spaced intervals, two adjacent hose nipples of the plurality being longer than the remaining hose nipples, whereby the teat cups to be interconnected therewith will be more distantly spaced from the main body and more widely separated from each other than the remaining teat cups, said main body having a diagonal hole therein in non-intersecting relation with the interior recess but intersecting the top and side wall of said main body, an air tube coupling comprising transverse air tube nipples disposed in a common plane to rest on top of the main body of the claw in alternating relation with the radially disposed inclined hose nipples thereof, a tubular stem with which the air tube nipples communicate disposed in inclined relation to the plane of said air tube nipples and insertable through the inclined hole in the main body, and a removable closure for the open bottom of said main body.

2. A teat cup claw for a milking apparatus, including a recessed main body, a plurality of hose nipples of different lengths disposed in radial planes and communicating with the interior of the main body, two adjacent hose nipples thereof being longer than the remaining hose nipples, said body having therein a diagonal hole intersecting the top and side surfaces of the main body disposed in a plane intermediate two adjacent hose nipples, an air tube coupling, including a plurality of air tube nipples, and a stem connected therewith and removably insertable through the diagonal hole in the main body in non-intersecting relation with the recess therein.

3. A teat cup claw for a milking apparatus, including a recessed main body, a plurality of hollow hose attachment nipples communicating with the interior of the recessed main body, and inclined in radial planes relative to the axis of the main body, two adjacent hose attachment nipples of the plurality terminating at a higher level than the opposite nipples and arranged with their terminals more widely spaced apart than those of the opposite nipples.

4. A teat cup claw for a milking apparatus, including a recessed main body, spaced hose nipples communicating with the recess thereof for interconnection of teat cups thereto, said main body having therein an eye in non-intersecting relation with the recess thereof, a separate air hose coupling including a plurality of intercommunicating hose nipples and a hollow stem common thereto removably insertable through the eye of the main body of the claw.

5. A teat cup claw for a milking apparatus, including a recessed main body, two pairs of adjacent hose nipples projecting therefrom in radial planes wherein they are upwardly inclined relative to the axis thereof and communicating with the recess of the body, one pair of hose nipples being longer than the other pair thereof and so disposed that their extremities are disposed at a higher level than those of said other pair thereof.

6. A teat cup claw for a milking apparatus, including a recessed main body, and four uniformly spaced hose nipples projecting therefrom in upwardly inclined directions to different levels and communicating with the recess of the main body, teat cups and flexible hose of uniform length connected with the respective nipples, said hose nipples being proportioned and arranged to compensate for the normally higher elevation and wider spacing of the forward teats of a cow's udder.

7. A milking apparatus, including a cluster of teat cups disposed at different levels when operatively connected to a cow's teats, a teat cup claw common thereto, upwardly and outwardly inclined nipples of different lengths forming component parts of the claw, and conduits interconnecting the teat cups with said inclined nipples, the conduits pertaining to the forward teats of a cow's udder being more widely spaced and at a different level relative to the claw when so connected than those pertaining to the rearmost teats thereof.

8. A teat cup claw, comprising a hollow main body and a plurality of hose nipples inclined in radial planes communicating with the interior thereof and converging toward a common point on the axis of the body, two of the hose nipples pertaining to the forward teats upon the cow's udder being of greater height and more widely separated at their extremities than the nipples pertaining to the rear teats upon a cow's udder.

9. A teat cup claw, including a hollow body and a plurality of milk tube nipples communicating therewith, said body having therethrough a hole in inclined relation with the axis of the body, and an air hose coupling including a plurality of transversely arranged intercommunicating hose nipples disposed in a common plane and a tubular stem common thereto projecting in inclined relation to the plane of the air hose nipples, and insertable through the inclined hole of the claw body.

10. A teat cup claw, including a recessed central body and a plurality of inclined hose nipples disposed in radial planes communicating with the recess of the body for interconnection of teat cup tubes therewith, the inclined nipples being equally spaced circumferentially of the central body, and two adjacent nipples being longer than the remaining nipples whereby the teat cup tubes connected therewith will be more widely spaced than those connected with the remaining nipples, and more distantly elevated above the central body than those connected to the remaining nipples.

11. A teat cup claw assembly for a milking apparatus, wherein a central body having a diagonal hole therein is provided with relatively spaced nipples disposed in radial planes for interconnection to a series of teat cups and supports a separable air tube coupling member including a plurality of radially disposed intercommunicating air tube nipples disposed in a common plane and a common tubular stem with which the air tube nipples communicate disposed at an inclination to the plane of the nipples and communicating therewith at the center of radiation of said nipples the construction and arrangement being such that the air tube coupling member is supported upon the central body by passing the inclined tubular stem thereof through the diagonal hole of the body.

12. A teat cup claw for a milking apparatus, including a recessed main body, hose couplings disposed in radial planes for connection of milk tubes of teat cups therewith, a separable unit comprising a plurality of radially disposed air tube nipples arranged in alternating relation with the teat cup milk tube nipples, for connection with the pulsating chambers of the teat cups, a milk exhaust tube nipple communicating with the recess of the body in downwardly inclined relation with the axis thereof, and an air exhaust tube nipple communicating with said plurality of air tube nipples also disposed in inclined relation with the axis of the main body and substantially parallel with the milk exhaust tube.

13. In a milking apparatus, a teat cup claw body comprising nipples extending radially from and inclined upwardly relative to the body of the claw and wherein two of the nipples have greater length from their connection to a common portion of the claw body to the free ends thereof than corresponding portions of two other of the nipples, the claw body having an opening extending therethrough in non-communicative relationship to the nipples and air hose coupling means maintained in operative relationship to the claw by means of said opening.

14. In a milking apparatus, a cluster of teat cups, flexible hose connections of uniform length associated therewith, a teat cup claw common thereto including a body portion with which portion the front and rear teat cup hose connections are interconnected in differently spaced relation, the two teat cup hose connections pertaining to the forward teats of the cow being more distantly elevated above the body portion of the claw assembly than the remaining teat cup hose connections, the construction and arrangement being such that the teat cup claw is permitted to swing relative to the cow's udder to a pendent position, wherein the weight of the teat cup claw is substantially equalized upon the several teats.

LLOYD F. BENDER.
JOHN A. SCHMITT.

REFERENCES CITED

The following references are of record in the file of this patent:

UNITED STATES PATENTS

| Number | Name | Date |
|---|---|---|
| 828,613 | Lane | Aug. 17, 1906 |
| 878,437 | Volger | Feb. 4, 1908 |
| 1,236,431 | Hawley | Aug. 14, 1917 |
| 1,316,582 | Leitch | Sept. 23, 1919 |
| 1,348,401 | Frimand | Aug. 3, 1920 |
| 1,385,577 | Oden | July 26, 1921 |
| 2,204,677 | Hodsdon | June 18, 1940 |
| 1,113,942 | Anderson | Oct. 20, 1914 |
| 71,582 | Cook | Dec. 3, 1867 |
| 951,403 | Lane | Mar. 8, 1910 |
| 1,301,992 | Anderson | Apr. 29, 1919 |
| 631,774 | Bundy | Aug. 29, 1899 |
| 1,859,213 | McCornack | May 17, 1932 |
| 935,338 | Uebler | Sept. 28, 1909 |
| 1,479,014 | Stampen | Jan. 1, 1924 |
| 1,118,258 | Anderson | Nov. 24, 1914 |

FOREIGN PATENTS

| Number | Country | Date |
|---|---|---|
| 16,068 | Australia | 1934 |